United States Patent [19]

Robison

[11] Patent Number: 4,570,724
[45] Date of Patent: Feb. 18, 1986

[54] STEPWISE ROTARY ACTUATOR

[75] Inventor: Hollis G. Robison, Magnolia, Tex.

[73] Assignee: Gray Tool Company, Houston, Tex.

[21] Appl. No.: 643,603

[22] Filed: Aug. 23, 1984

[51] Int. Cl.⁴ .................. F16H 27/02; F01B 3/00; E21B 43/12
[52] U.S. Cl. .................. 175/113; 92/33; 166/319; 251/58
[58] Field of Search .................. 175/113, 114, 101; 166/330, 320, 319; 251/58, 59, 12; 137/625.66; 92/33, 71, 129

[56] References Cited

U.S. PATENT DOCUMENTS

| | | | |
|---|---|---|---|
| 3,153,986 | 10/1964 | Mitchell | 92/33 |
| 3,450,382 | 6/1969 | Calim | 251/58 |
| 3,776,106 | 12/1973 | Pish | 92/33 |
| 4,262,693 | 4/1981 | Giebeler | 251/58 X |
| 4,403,523 | 9/1983 | Seger | 251/58 X |

*Primary Examiner*—Donald Watkins
*Assistant Examiner*—Thomas R. Hannon
*Attorney, Agent, or Firm*—Troxell K. Snyder

[57] ABSTRACT

An actuator for imparting a series of stepwise rotational movements to a valve shaft (2) or the like is provided. A bidirectional actuator, comprised of two opposing unidirectional actuators, includes a central drive wheel (6) secured to the shaft (2) and a pair of drive pistons (8, 10) axially reciprocable along the shaft (2). During reciprocation of the drive pistons (8, 10) protruding follower pins (30, 32) move within cam races (44, 46) disposed in the fixed housing (4). The cam races (44, 46) are so configured to allow the drive pistons (8, 10) to move into engagement with the drive wheel (6), before imparting a stepwise rotational movement thereto. During the return motion of the drive pistons (8, 10) the cam races (44, 46) are so configured to allow the pistons to disengage the drive wheel (6) before returning to their starting positions. A detent (54) for holding the drive wheel (6) and shaft (2) in any one of a preferred plurality of index positions is also disclosed.

12 Claims, 4 Drawing Figures

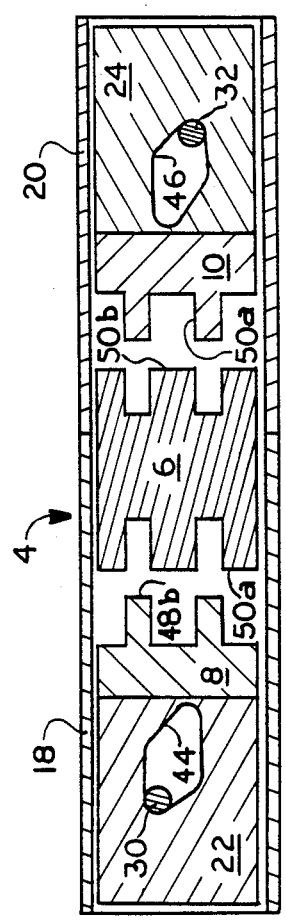
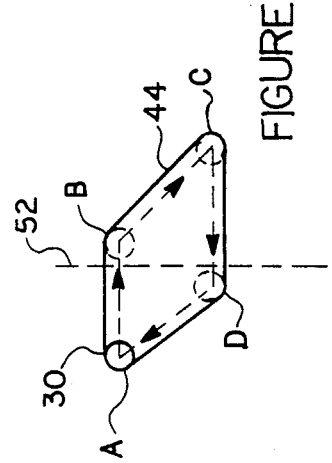

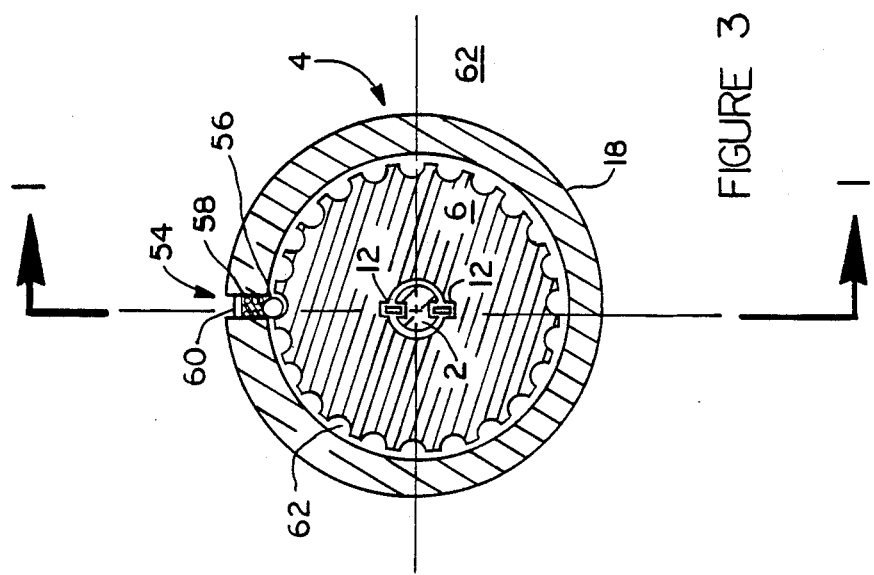

4,570,724

STEPWISE ROTARY ACTUATOR

FIELD OF THE INVENTION

The present invention relates to an actuator for controllably turning an elongated shaft member about a central axis, and more particularly, to an actuator for turning an elongated shaft member, such as the stem of an adjustable control valve, in a series of stepwise rotational increments.

BACKGROUND OF THE INVENTION

When finally completed and put into production, oil and gas wells located beneath the ocean or on remote platforms or other inaccessible locations are most often connected together at a common control center, and a series of flow control valves, known as chokes, are installed in the main flow line of each well to control the rate of material flow therefrom. It is desirable to provide for remote regulation of flow from each individual well by supplying each choke valve with a separate actuator capable of positively and incrementally opening and closing that particular choke valve upon command from a remote operator.

The existence and use of such actuators is well known in the valve control art, however actuators used in subsea or other inaccessible locations for the control of producing oil or gas wells must meet particularly exacting standards. Specifically, the actuator for a remote choke must be able to readily withstand hostile environments, which may include physical abuse, corrosive conditions, and little or no maintenance. Moreover, it is essential that the actuator be capable of selectively positioning and returning the choke to any one of a number of setpoints upon command in order to optimize the rate of production from the control well.

SUMMARY OF THE INVENTION

The present invention provides an actuator for positively and uniformly imparting a series of rotational displacements to an elongated shaft member or the like. The actuator includes a drive wheel, secured to the shaft member and a drive piston co-axially reciprocable along the shaft member. A fixed housing surrounds the drive piston and drive wheel for protection as well as to provide a cam race for imparting rotary motion to the drive piston during reciprocation.

During operation of the actuator according to the present invention, the drive piston is forced axially inward into engagement with the drive wheel and, as a result of the action of a follower pin in the housing cam race, imparts an incremental rotary displacement to the drive wheel and hence the shaft member. The drive piston then returns outwards to its starting position, the cam race being configured so as to allow the drive piston to move without rotary motion until disengaged with the drive wheel.

Each reciprocation of the drive piston thus results in an incremental rotation of the drive wheel and shaft member in the desired direction. By pairing two unidirectional actuators with a common drive wheel, each actuator configured to drive the shaft member in an opposite direction, the shaft member may be driven in either direction by selective operation of the appropriate actuator.

The present invention provides a simple, positive rotary actuator for imparting uniform rotary displacements to an elongated shaft member or the like. Such an actuator, in particular if paired with a second adapted for imparting an opposite rotary motion to the shaft member, could be beneficially utilized for remote control of valves or other equipment which requires accurate incremental shaft rotation for positioning.

It is an additional feature of the actuator according to the present invention that a detent mechanism is included between the housing and the drive wheel for releasably holding the drive wheel in any one of a plurality of preferred rotational positions.

BRIEF DESCRIPTION OF THE DRAWING FIGURES

FIG. 2 is a sectional view taken through the follower pins and cam races as shown.

FIG. 3 is a radial sectional view taken through the drive wheel as shown.

FIG. 4 is a schematic representation of the path taken by the follower pin in the cam race during operation of the actuator.

DESCRIPTION OF THE PREFERRED EMBODIMENT

Figure 1:
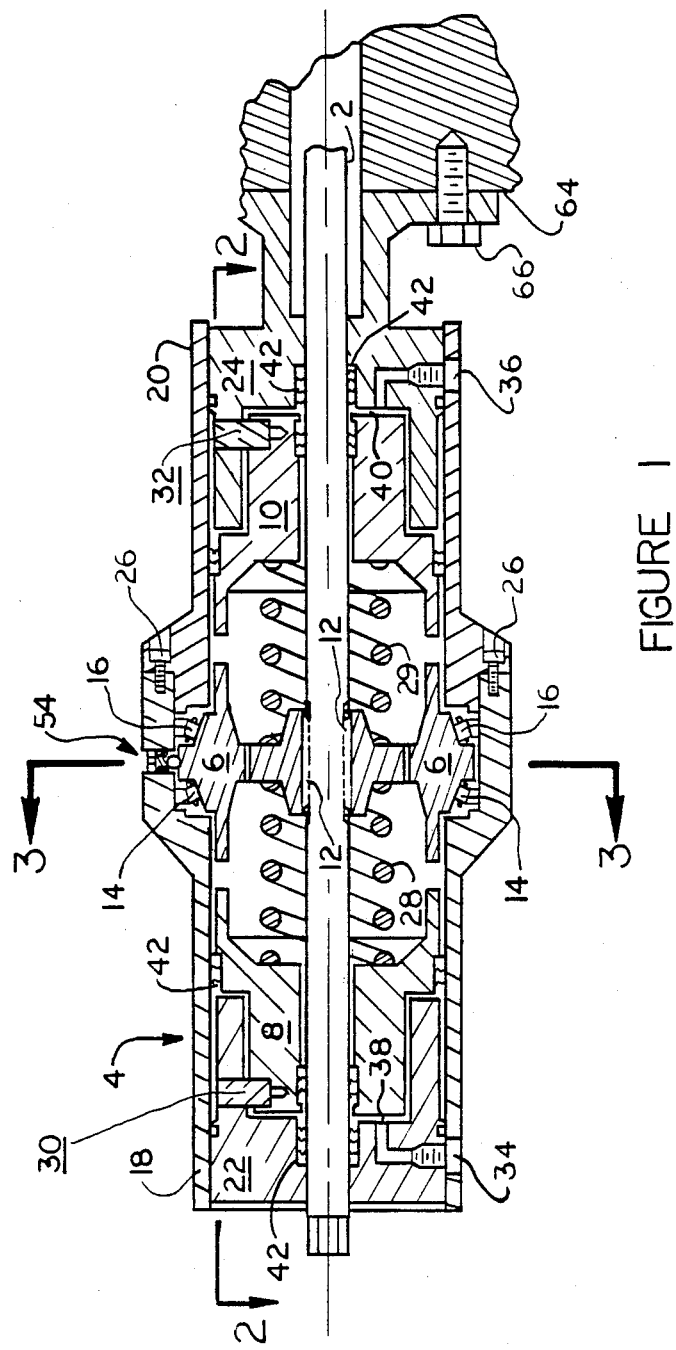
FIG. 1 is a sectional view of the actuator according to the present invention taken through the central axis of the shaft member.

Turning now to the drawing figures, and especially to FIG. 1, the preferred embodiment of the actuator according to the present invention will be discussed in detail. The preferred embodiment, a bidirectional actuator, includes an outer housing 4 shown surrounding the drive wheel 6 and paired opposing drive pistons 8, 10. The drive pistons 8, 10 are coaxially reciprocable about the shaft member 2 which is secured to the drive wheel 6 against relative rotational motion by keys 12. Roller thrust bearings 14, 16 provide support between the drive wheel 6 and the housing 4 while permitting rotational motion therebetween. Housing 4 in the preferred embodiment comprises left half 18, right half 20, left end cap 22, and right end cap 24, all secured each to the other by various means well known in the art, such as machine screws 26.

For simplicity, when discussing the components in operation of the actuator of the preferred embodiment, it should be understood that inward shall represent axial direction or motion toward the plane of FIG. 3 as shown in FIG. 1, i.e., toward the drive wheel, while outward shall represent motion or direction away from this plane. Thus it is apparent by examining FIG. 1 that the return springs 28, 29 serve each to urge their respective drive pistons 8, 10 outward from the drive wheel 6. Drive pistons 8, 10 are axially reciprocable and rotatable about the shaft member 2. Each is shown having a follower pin 30, 32, respectively secured thereto and projecting in the radial direction therefrom.

Axial reciprocation of the drive pistons 8, 10 is initiated in the preferred embodiment by application of hydraulic force to respective pressure ports 34, 36. A sufficient hydraulic force thus applied would pressurize the cavity 38, 40 outward of each drive piston 8, 10 and force that particular piston inward against the respective return spring 28, 30. Upon completion of the inward reciprocal axial motion, the pressure is released, and the drive piston freed to return axially outward under the influence of the corresponding return spring. Pressure seals and packing, designated generally by numeral 42 are shown disposed throughout the actuator as appropriate to prevent leakage or other pressure loss from the cavities 38, 40.

Hydraulic pressure may be supplied by interconnecting ports 34, 36 with any suitable source of hydraulic or pneumatic pressure, such as a reservoir tank, a compressor, a pressurized supply line, etc. Both these and other means for selectably applying hydraulic energy to a pressure port for control purposes are well known in the art and need not be disclosed further.

Referring now to FIG. 2, the indicated sectional view of the end caps 22, 24 is shown. Each end cap includes a respective cam race 44, 46 disposed therein. Also shown are the respective follower pins 30 and 32 protruding radially from the corresponding drive pistons 8, 10. The follower pins 30, 32 are confined by the respective cam races 44, 46. Drive wheel 6 is also shown in this representation, positioned between drive pistons, 8, 10. As will be appreciated by those familiar with drafting techniques, FIG. 2 is not a true chordal section of the cylindrical actuator of FIG. 1, but rather a representative depiction of the interrelationship and main appearance features of each of the primary components of the preferred embodiment actuator. Thus element 4, the housing, is not shown in its entirety.

Referring now specifically to the individual elements shown, the drive pistons 8, 10 and the drive wheel 6 are seen to be engageable by virtue of corresponding pairs of drive fingers 48a, 48b and 50a, 50b. Upon axial translation of either drive piston 8, 10 inward, the respective piston drive fingers 48a, 50a will slip between the corresponding wheel drive fingers 48b, 50b thus prohibiting relative rotational motion between the so engaged drive piston and the drive wheel.

The action and purpose of cam races 44, 46 and follower pins 30, 32 should now be apparent, and will be described hereinbelow with reference to the left-hand actuator components only. After permitting the drive piston 8 to translate axially inward until engaged with the drive wheel 6, the cam race 44 is configured to impart radial motion to the drive piston 8 via the corresponding follower pin 30. As the drive piston 8 is forced further inward, the sloping face on the inner portion of the cam race 44 deflects the follower pin 30 thus turning the drive piston 8 about the shaft member 2. This motion of the drive piston 8 while engaged with the drive wheel 6 results in positive rotation of the drive wheel 6 and hence the shaft member 2.

Upon completion of the inward axial motion of the drive piston 8 and relaxation, in the preferred embodiment, of the driving hydraulic pressure, the drive piston 8 is urged axially outwardly by the corresponding return spring 28. For the return journey to its original starting point, the drive piston 8 initially moves outwardly without rotation until disengaged with the drive wheel 6, at which point the outward sloping section of the cam race 44 imparts a reverse rotational motion to the drive piston 8 via the corresponding follower pin 30. Upon return to the full outward position, the drive piston 8 has regained its original angular and axial position, and is ready for initiation of another reciprocation.

The preceding discussion is equally applicable to the right hand components of FIG. 1, i.e., cam race 46, follower pin 32, drive piston 10, and drive fingers 50a, 50b. The cam race 46 is configured to deflect the follower pin 32 in a direction opposite that of cam race 44 and follower pin 30, thus providing bidirectional movement to the shaft member 2 upon selective reciprocation of the drive pistons 8, 10.

Referring to FIG. 4, wherein the motion of the follower pin 30 in the race 44 is depicted, it can be seen that the follower pin 30 intitially occupies position A in the upper left corner of the cam race 44. Upon initiation of inward axial motion, the pin passes the point of engagement represented by broken line 52 of the drive fingers 48a, 48b and eventually reaches position B without having undergone any rotational motion. Upon further axial movement of the piston 8 inward toward drive wheel 6, the cam race 44 urges the pin 30 downward along this inner portion of cam race 44 toward position C, thus imparting a clockwise rotational motion to the drive piston 8 when viewed from the left hand side of FIG. 2.

Cam race 44 is configured so as to impart exactly the amount of angular displacement sufficient to result in one incremental stepwise rotational motion of the drive piston 8, drive wheel 6, and shaft member 2.

After full inward axial motion of the drive piston 8 and the follower pin 30 in the preferred embodiment, the hydraulic pressure supplied through port 34 is released and the drive piston 8 allowed to return upward under the influence of return spring 28. Follower pin 30 describes a different path on this return journey, moving axially outward from position C to position D without rotational motion. As can be seen clearly in FIG. 4, pin position D is past the point of disengagement represented by dashed line 52, thus allowing the drive piston 8 to rotate freely and independently as the piston moves still further axially outward and the follower pin 30 moves from point D back to point A under the influence of cam race 44. Repetitive reciprocation of the drive piston 8 thus results in repeated stepwise rotary displacements of the drive wheel 6 and shaft member 2 thus allowing precision positioning or rotation of the shaft member 2.

As can be seen by referring again to FIG. 2, cam races 44 and 46 are configured so as to cause the corresponding drive pistons 8, 10 to each impart an opposite rotary motion to the drive wheel 6 upon reciprocation. Thus result is a bidirectional actuator wherein the drive wheel 6 and shaft member 2 may be selectively rotated in either direction.

The selective bidirectional rotation of a shaft member or the like is useful in applications where a fixed amount of angular displacement must be positively imparted, typically for control or other purposes. One typical application is in the remote control of oil field apparatus, such as flow control valves or chokes, as presented hereinabove. In this application, the shaft member 2 would be the valve stem of the flow control valve, and the housing 4, which must be secured against rotation, would be fastened to the valve body 64 by bolts 66, clamps, or other mechanical means well known in the art. Depending on the flow desired through this particular valve, a remote operator would initiate the appropriate number of hydraulic pulses to the appropriate cavity 38, 40 for turning the valve stem a predetermined magnitude.

In the application of the actuator according to the present invention to the rotation of a valve stem, it should also be noted that this actuator is not restricted for use to those valves wherein the stem is of the non-rising type, but would also be applicable to rising stem valves by the use of corresponding longitudinal splines on shaft member 2 and drive wheel 6 which would serve to restrain relative rotational motion therebetween while still permitting the shaft member 2 to slip axially through the drive wheel 6.

Referring finally to FIG. 3, a cross section taken perpendicular to the shaft member 2 through the drive wheel 6, the details of detent mechanism 54 and the interaction thereof with drive wheel 6 may be clearly seen. Detent mechanism 54 consists of a ball member 56 disposed radially inward of a spring member 58 which in turn is restrained against outward radial movement by set screw 60 disposed in the housing 4. The ball member 56 is urged radially inward by spring member 58 into any one of the plurality of recesses 62 disposed about the circumference of drive wheel 6. The action of ball member 56 in the recesses 62 of the drive wheel 6 serves to releasably restrain drive wheel 6 in any one of a plurality of preferred index positions corresponding to each recess 62.

The rotational displacement between each index position is equivalent to the incremental displacement imparted by a single reciprocation of the drive pistons 8, 10, and corresponds to the starting and end positions of each displacement. Thus each reciprocation of a drive piston 8, 10 results in the movement of the drive wheel 6 one index position in either direction moving the adjacent recess 62 into engagement with the ball member 56. By controlling the compression of spring member 58, as well as the depth of the recesses 62 in the drive wheel 6, the amount of force necessary to release the drive wheel 6 from the current index position and move the drive wheel to the next adjacent index position may be controlled so as to prevent undesirable motion of the drive wheel 6 and shaft member 2.

The detent mechanism 54 also finds application in those situations, such as the valve use discussed hereinabove, where the likelihood of self-rotation of the shaft member 2 is small. In such situations, the detent mechanism 54 can serve to prevent misalignment of the corresponding drive fingers 48a, 48b, 50a, 50b caused by wear of the keys 12 and keyways in the shaft 2 and drive wheel 6, or for an audible and tactile indication to a manual valve operator that the shaft 2 and drive wheel 6 are properly positioned for rotation by the actuator mechanism.

As can be appreciated by one skilled in the art, when the actuator according to the present invention is in the unenergized state, the central shaft 2 may be rotated by external means, restrained only by the action of detent mechanism 54. This feature is particularly useful in field applications wherein a local manual adjustment of a particular valve or shaft member may be desirable. In such a situation, detent means 54 would assist the manual operator in rotatably positioning the shaft member 2 in one of the preferred index angular displacements.

Although couched in terms of hydraulic pressure and springs, it is to be understood that the means for urging the respective drive pistons 8, 10 inwardly and outwardly in reciprocating motion shall not be limited thereto, but shall in fact include pneumatic, magnetic, electrical, mechanical, and other means and methods both individually and in combination known in the art for imparting motion to components of this type. It should likewise be noted that although the preferred embodiment is shown enclosed within a single housing and capable of bidirection stepwise rotary motion, the present invention includes a unidirectional stepwise rotary actuator for positively rotating a shaft member or the like in a single direction.

It should still be further noted that one skilled in the art upon careful reading of the above specification and examination of the dependent claims and drawing figures would find many other features, advantages, and structure within the scope of the present invention, and that therefore the pictured preferred embodiment and the discussion thereof should be taken in an illustrative and not a limiting sense.

I claim:

1. An apparatus for imparting stepwise, unidirectional rotary motion to a shaft member, comprising:
   a drive wheel, secured about said shaft against relative rotational motion therebetween;
   a drive piston, disposed about said shaft and rotatably movable and axially translatable with respect thereto, further including means for engaging the drive wheel upon translation of the drive piston toward the drive wheel for the prevention of relative rotational motion between the engaged drive wheel and drive piston;
   a housing, disposed about the drive wheel and drive piston and secured against rotational motion, the housing further including a cam race disposed therein;
   means for reciprocating the drive piston between a first axial position unengaged with the drive wheel and a second axial position engaged with the drive wheel;
   a follower pin, secured to the drive piston and projecting radially outward therefrom, said follower pin being movable within the cam race for defining the angular position of the drive piston during the reciprocation thereof; and
   wherein the cam race is configured so as to
   a. not require angular displacement of the drive piston during a first inward portion of the drive piston axial displacement, said first inward axial displacement portion being sufficient to engage said engagement means,
   b. induce a relative rotational displacement of the drive piston during the remaining portion of the inward axial displacement of the drive piston, said first relative rotational displacement occurring between the housing and the drive piston, being in the direction of the desired stepwise rotary motion, and being equal in magnitude to the desired stepwise rotational increment,
   c. not require angular displacement of the drive piston during a first outward portion of the drive piston return axial displacement, said first outward axial return displacement portion being sufficient to disengage said engagement means, and
   d. induce a second relative rotational displacement of the drive piston during the remaining portion of the outward return axial displacement of the drive piston, said second relative rotational displacement being of equal magnitude and in opposite direction to the first relative rotational displacement, whereby the drive piston is returned to the position occupied thereby prior to the initiation of the drive piston reciprocation.

2. The apparatus of claim 1, wherein the reciprocating means comprises:
   a substantially sealed volume formed by the housing and the drive piston, opposite the drive wheel;
   a source of hydraulic pressure, selectively applicable to the sealed volume for forcing the drive piston from the first axial position to the second axial position; and means for returning the drive piston to the first axial position when the source of hydraulic pressure is removed from the sealed chamber.

3. The apparatus of claim 2, wherein the returning means is a spring, disposed between the drive wheel and the drive piston for urging the drive piston away from the drive wheel.

4. The apparatus of claim 2, further comprising means disposed between the housing and the drive wheel, for releasably detaining the drive wheel in any one of a plurality of angular positions corresponding to the stepwise rotary motion thereof.

5. The apparatus of claim 1, wherein the engaging means includes a plurality of fingers disposed about the circumference of the drive piston and extending axially inward therefrom, said drive piston fingers cooperating during the engagement thereof with a corresponding plurality of fingers disposed about the circumference of the drive wheel and extending axially outward therefrom.

6. A bidirectional stepwise rotary actuator, comprising two unidirectional actuators, each according to claim 1 and each independently actuable for rotating said shaft, the first unidirectional actuator being operable for rotating said shaft in a clockwise direction, and the second unidirectional actuator being operable for rotating said shaft in a counterclockwise direction.

7. The bidirectional actuator of claim 6, wherein the first unidirectional actuator and the second unidirectional actuator each share a common housing and a common drive wheel.

8. A bidirectional stepwise rotary actuator for selectably positioning a rotary shaft or the like, comprising:

a drive wheel, secured about said shaft against relative rotational motion therebetween;

a housing, secured against rotational motion;

a first drive piston axially reciprocable along said shaft and rotable thereabout;

first means for engaging the first drive piston and drive wheel against relative rotational motion therebetween for a portion of the reciprocal motion of the first drive piston, the drive wheel and the first drive piston being otherwise unengaged and independently rotable;

first means, disposed between the housing and the first drive piston, for imparting a stepwise rotational displacement to said shaft in the clockwise direction during the engaged portion of the reciprocal motion of the first drive piston and for imparting a corresponding counterclockwise stepwise rotational displacement to the first drive piston during the disengaged portion of the reciprocal motion of the first drive piston;

a second drive piston axially reciprocable along said shaft and rotable thereabout;

second means for engaging the second drive piston and drive wheel against relative rotational motion therebetween for a portion of the reciprocal motion of the second drive piston, the drive wheel and second drive piston being otherwise unengaged and independently rotatable;

second means, disposed between the housing and the second drive piston, for imparting a stepwise rotational displacement to said shaft in the counterclockwise direction during the engaged portion of the reciprocal motion of the second drive piston and for imparting a corresponding clockwise stepwise rotational displacement to the second drive piston during the disengaged portion of the reciprocal motion of the second drive piston; and means for selectably and independently reciprocating the first drive piston and the second drive piston.

9. The actuator of claim 8 wherein the first rotation imparting means further includes:

a follower pin, secured to the first drive piston and extending therefrom transversely to the direction of reciprocation; and a cam race, disposed in the housing and surrounding the follower pin, the cam race being configured to induce rotational motion in the follower pin and drive piston during the axially reciprocation thereof.

10. The actuator of claim 9, wherein the first means for reciprocating the first drive piston further includes:

means for hydraulically urging the first drive piston toward the drive wheel; and a spring disposed between the drive wheel and the first drive piston for urging the first drive piston away from the drive wheel.

11. The actuator of claim 10, wherein the first engagement means further comprises:

a plurality of piston drive fingers, secured to the first piston and extending axially toward the drive wheel; and a plurality of wheel drive fingers, secured to the drive wheel and extending axially toward the first drive piston, for interlocking with the piston drive fingers during the reciprocation of the first drive piston.

12. The actuator of claim 8, wherein the first means for reciprocating the first drive piston further includes:

means for hydraulically urging the first drive piston toward the drive wheel; and a spring disposed between the drive wheel and the first drive piston for urging the first drive piston away from the drive wheel.

* * * * *